US012717538B2

(12) United States Patent
Patra et al.

(10) Patent No.: US 12,717,538 B2
(45) Date of Patent: Aug. 25, 2026

(54) AI-DRIVEN ADAPTIVE USER INTERFACE AMELIORATION IN SCREEN SHARING

(71) Applicant: International Business Machines Corporation, Armonk, NY (US)

(72) Inventors: Suman Patra, Raritan, NJ (US); Valerie Lampkin, Saint George Island, FL (US); Avinash Asthana, Jersey City, NJ (US); Tiberiu Suto, Franklin, NY (US); Neil Delima, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 18/651,895

(22) Filed: May 1, 2024

(65) Prior Publication Data

US 2025/0342001 A1 Nov. 6, 2025

(51) Int. Cl.

| | |
|---|---|
| ***G06F 3/14*** | (2006.01) |
| ***G06T 7/10*** | (2017.01) |
| ***G06V 30/10*** | (2022.01) |
| ***G10L 15/26*** | (2006.01) |

(52) U.S. Cl.
CPC .............. *G06F 3/1454* (2013.01); *G06T 7/10* (2017.01); *G06V 30/10* (2022.01); *G10L 15/26* (2013.01)

(58) Field of Classification Search
CPC ......... G06F 3/1454; G06T 7/10; G06V 30/10; G10L 15/26
USPC .......................................................... 345/2.2
See application file for complete search history.

(56) References Cited

U.S. PATENT DOCUMENTS

| | | | | |
|---|---|---|---|---|
| 9,781,385 | B2 * | 10/2017 | Ma | H04N 7/15 |
| 10,832,057 | B2 | 11/2020 | Chan | |
| 10,924,709 | B1 | 2/2021 | Faulkner | |
| 11,275,949 | B2 | 3/2022 | Chan et al. | |
| 11,726,634 | B2 | 8/2023 | Alonso Ruiz | |
| 11,800,058 | B2 | 10/2023 | Mayfield | |
| 11,804,249 | B2 * | 10/2023 | Bloch | G11B 27/10 |
| 12,204,810 | B2 * | 1/2025 | Tennøe | G06V 30/224 |

(Continued)

FOREIGN PATENT DOCUMENTS

EP 2672376 A2 * 12/2013 .......... G06T 3/4092

OTHER PUBLICATIONS

GMI, “Video Conferencing Market”, GMI, Global Market Insights, 2022, 7 Pages.

(Continued)

*Primary Examiner* — Temesghen Ghebretinsae
(74) *Attorney, Agent, or Firm* — Michael O’Keefe

(57) ABSTRACT

According to one embodiment, a method, computer system, and computer program product for adaptive user interface amelioration during a screen sharing session is provided. The embodiment may include receiving shared content during a screen sharing session. The embodiment may also include identifying one or more device characteristics for a user device associated with a user and one or more user profile characteristics for the user. The embodiment may further include extracting topical elements within the received shared content. The embodiment may also include identifying a location of one or more objects and/or one or more text elements in the shared content. The embodiment may further include modifying a viewing area of the shared content on a display screen of the user device.

20 Claims, 3 Drawing Sheets

(56) References Cited

U.S. PATENT DOCUMENTS

| | | | | |
|---|---|---|---|---|
| 2006/0122840 | A1 | 6/2006 | Anderson | |
| 2011/0270609 | A1* | 11/2011 | Jones | G10L 15/26 704/235 |
| 2014/0019883 | A1* | 1/2014 | Tandon | H04N 7/152 715/756 |
| 2014/0258856 | A1 | 9/2014 | Mauro | |
| 2015/0234493 | A1 | 8/2015 | Parivar | |
| 2015/0293650 | A1 | 10/2015 | Dukhovny | |
| 2016/0173821 | A1 | 6/2016 | De Magalhaes | |
| 2018/0365657 | A1* | 12/2018 | Kitada | H04N 21/43072 |
| 2022/0060659 | A1* | 2/2022 | Pell | H04L 65/80 |
| 2024/0040081 | A1 | 2/2024 | Mayfield | |
| 2024/0104877 | A1* | 3/2024 | Henderson | G06F 3/011 |
| 2025/0037417 | A1* | 1/2025 | Bisti | H04N 5/57 |
| 2025/0055891 | A1 | 2/2025 | Jenkins et al. | |

OTHER PUBLICATIONS

Gronbaek et al., “Mirrorverse: Live Tailoring of Video Conferencing Interfaces”, Proceedings of the 36th Annual ACM Symposium on User Interface Software and Technology, 2023, 14 Pages.

Stiefelhagen, Rainer, “Tracking focus of attention in meetings”, Published in Proceedings, Fourth IEEE International Conference on Multimodal Interfaces, IEEE, 2002, 8 Pages.

Goyal, et al., “ScreenSeg: On-Device Screenshot Layout Analysis”, arXiv:2104.08052v2, Apr. 21, 2021, 8 Pages.

* cited by examiner

AI-DRIVEN ADAPTIVE USER INTERFACE AMELIORATION IN SCREEN SHARING

BACKGROUND

The present invention relates generally to the field of computing, and more particularly to web conferencing.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC. and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for adaptive user interface amelioration during a screen sharing session is provided. The embodiment may include receiving shared content during a screen sharing session. The embodiment may also include identifying one or more device characteristics for a user device associated with a user and one or more user profile characteristics for the user. The embodiment may further include extracting topical elements within the received shared content. The embodiment may also include identifying a location of one or more objects and/or one or more text elements in the shared content. The embodiment may further include modifying a viewing area of the shared content on a display screen of the user device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
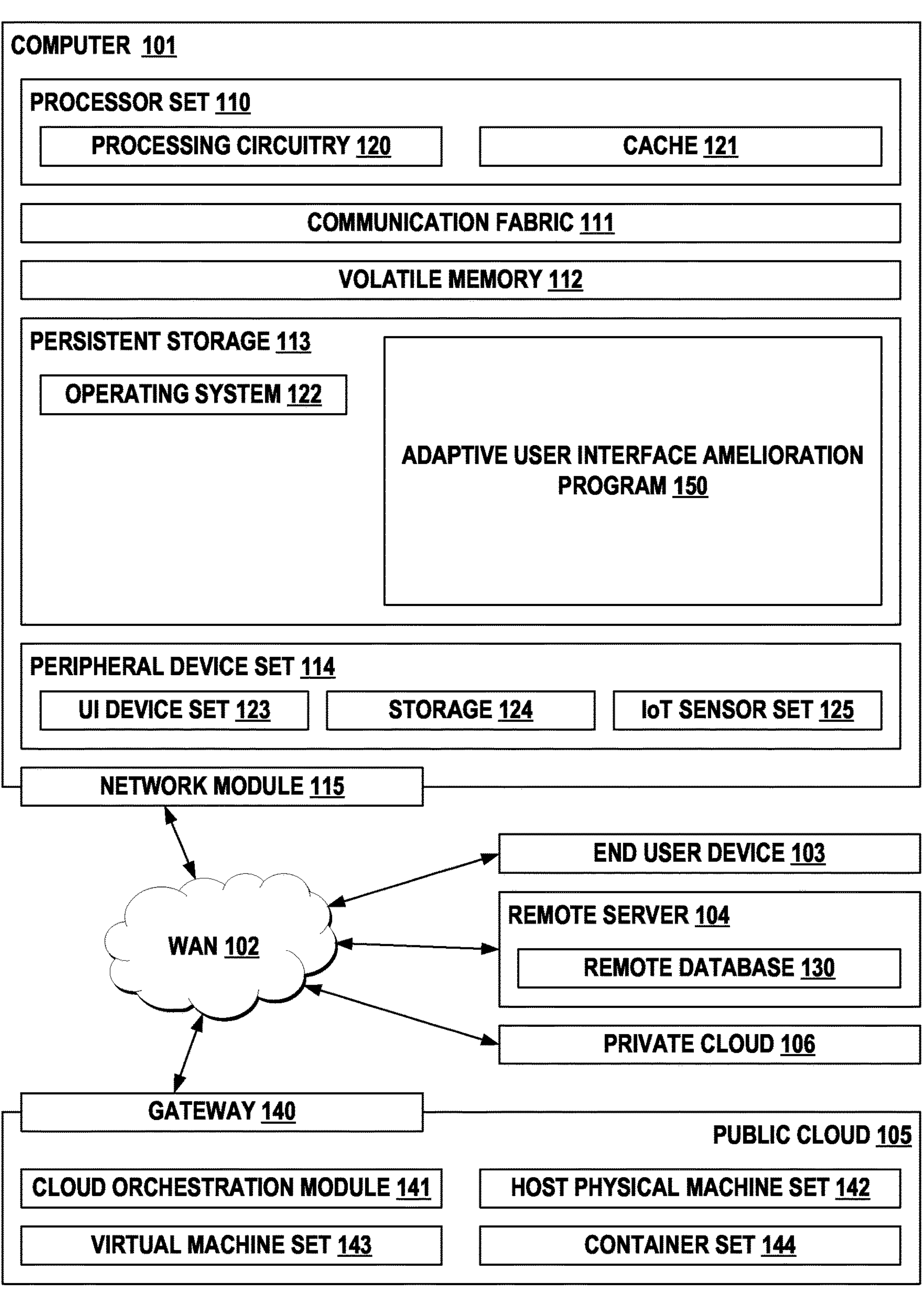
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to web conferencing. The following described exemplary embodiments provide a system, method, and program product to, among other things, to dynamically adapt the layout and focus of the visible area of a display screen shown during a screen sharing session of a web conference customized for each user. Therefore, the present embodiment has the capacity to improve the technical field of web conferencing by providing a dynamic and customizable viewing experience that is specific to each user's needs and specific device capabilities.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom®, Webex®, GoToMeeting®, and FaceTime® among others.

To provide a better user experience when consuming the same digital content across a wide variety of devices with varying form factors from laptops, tablets, and smartphones, application with responsive and adaptive user interfaces emerged. While the application itself was designed to be responsive, the content created by a user of the application is often not, and, therefore, might not offer the best user experience across different devices. For example, screen sharing of content via a web conference that allows users with devices of different form factors may be responsive to the form factor of the presenter or other web conference participants, but may result in a suboptimal user experience. As an additional example, a slide presentation shared via a web conferencing application may not provide an optimal user experience for a meeting participant who has joined the web conference via a smartphone or tablet when the screen sharing participant is using a laptop or desktop computer with different form factors (e.g., screen dimensions).

The user experience inefficiencies may be further amplified when the shared content contains decipherable information required for interpretation and/or understanding by the viewing participants. In such situations, participants affected by inefficiencies in the screen sharing session may need to zoom in to selective/important parts of the shared screen to effectively follow along with the sharing participant's presentation. This suboptimal user experience may lead to other issues such as user physical and/or mental fatigue after prolonged exposure. As such, it may be advantageous to, among other things, dynamically adapt the layout of content shared via a screen sharing session to meet the accessibility needs of multiple participants viewing the shared screen content using devices with different form factors.

According to at least one embodiment, an adaptive user interface amelioration program may be an edge computing application implementation or a part of a web conferencing client that takes in various inputs, such as, but not limited to, the current conversation/discussion between web conference participants, video content related to a screen sharing session (e.g., image frames), the type of end user device utilized by a web conference participant, and a user profile and other characteristics (e.g., distance of a user from a display screen, ocular strain or fatigue experienced by a user, user light sensitivity, and background lighting in the environment around the user). The adaptive user interface amelioration program may analyze and classify current speech transmitted during the web conference, classify objects from video stream images, map classifications of objects between the classified speech and images, and, depending on a type of device utilized by a user and user characteristics, determining what displayed objects need to be focused on or highlighted using a filtered list of matching objects. The adaptive user interface amelioration program may then modify the user interface of the web conferencing program to focus or zoom into a section of the screen determined to be topical to the current conversation between the web participants.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as adaptive user interface amelioration program 150. In addition to adaptive user interface amelioration program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and adaptive user interface amelioration program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in adaptive user interface amelioration program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in adaptive user interface amelioration program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the adaptive user interface amelioration program 150 may receive media transmitted during a web conference screen sharing session and, using natural language processing (NLP)-driven text summarization, topical analysis, optical character recognition, NLP-drive image translation, and image object detection, identify content on a sharing participant's display screen that is the topic of the current conversation between the web conference participants. The adaptive user interface amelioration program 150, knowing the device constraints and formatting for the user device associated with one or more web conference participants, may modify (e.g., zoom and/or shift focus) the user device display screen for each web conference participant to optimize the presented screen share for the participant that focuses on the identified content.

Additionally, prior to initially performing any actions, the adaptive user interface amelioration program 150 may perform an opt-in procedure. The opt-in procedure may include a notification of the data the adaptive user interface amelioration program 150 may capture and the purpose for which that data may be utilized by the adaptive user interface amelioration program 150 during data gathering and operation. Furthermore, notwithstanding depiction in computer 101, the adaptive user interface amelioration program 150 may be stored in and/or executed by, individually or in any combination, end user device 103, remote server 104, public cloud 105, and private cloud 106. The adaptive user interface amelioration method is explained in more detail below with respect to FIGS. 2, 3A, and 3B.

Figure 2:
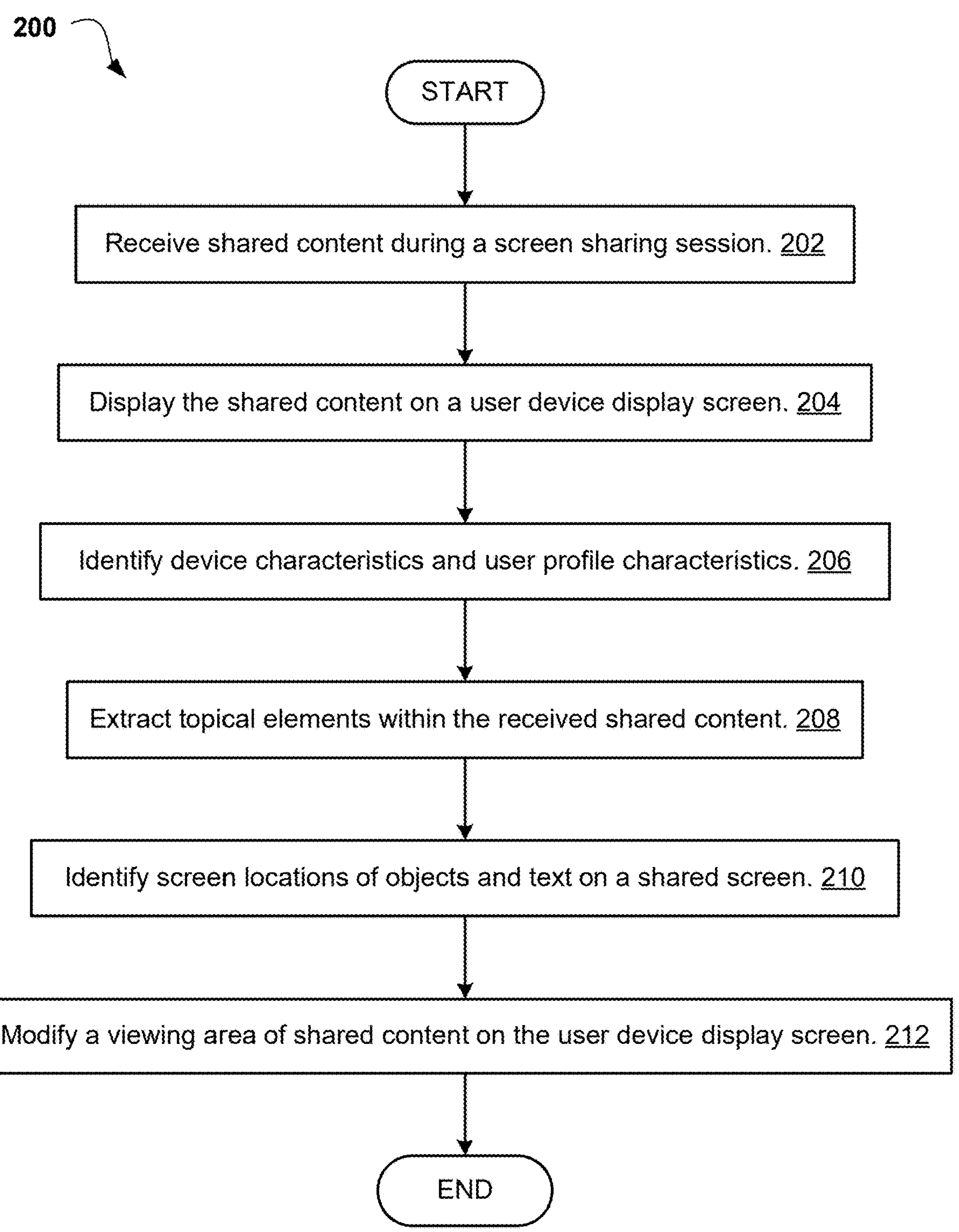
FIG. 2 illustrates an operational flowchart for an adaptive user interface amelioration process according to at least one embodiment.

Referring now to FIG. 2, an operational flowchart for an adaptive user interface amelioration process 200 according to at least one embodiment. During an initial setup phase to establish analyzation of language and images shared during a live screen sharing session, the adaptive user interface amelioration program 150 may leverage, configure, and/or integrate speech-to-text, natural language processing services or libraries to translate conversation to text, natural language understanding and language topic analysis methods, libraries, or services to analyze conversational text, natural language understanding methods, libraries, or services for word embedding/association, optical character recognition libraries to extract text from images and video frames from a screen sharing session, and image object recognition methods, libraries, or services to identify objects in video frame images from a screen sharing session.

At 202, the adaptive user interface amelioration program 150 receives shared content during a screen sharing session. As a live screen sharing session is commenced during a web conference between a sharing participant and one or more other participants, the adaptive user interface amelioration program 150 may receive an audio feed and video feed from each participant taking part in the web conference. The audio and video feeds may include metadata, such as tags and timestamps. If the audio or video feeds do not include metadata needed by the adaptive user interface amelioration program 150, the adaptive user interface amelioration program 150 may generate the needed metadata. For example, the adaptive user interface amelioration program 150 may tag an audio feed as originating from a specific participant or timestamp a video feed when a sharing participant changes to a different slide or graphical user interface view of the screen sharing session. In one or more embodiments, the video feed may include image data.

In one or more embodiments, the adaptive user interface amelioration program 150 may be configured to capture and store user profile information that includes, but is not limited to, device accessibility preferences, such as preconfigured font or image size, speaker volume preferences, microphone volume preferences, topics and keywords of interest from historical communications, and a system opt-in preference.

Then, at 204, the adaptive user interface amelioration program 150 displays the shared content on a user device display screen. The adaptive user interface amelioration program 150 may display the shared content in the course of the screen sharing session so that each participant can view the screen share as intended by the sharing participant. For example, if the sharing participant is sharing a report to an organization during a web conference, the adaptive user interface amelioration program 150 may display the report on the device display screen for each participant viewing the screen share.

Next, at 206, the adaptive user interface amelioration program 150 identifies device characteristics and user profile characteristics. In order to properly modify the viewing area of a user device display screen presenting the screen share, the adaptive user interface amelioration program 150 may determine various device statistics, including, but not limited, a type of user device (e.g., laptop, tablet, smartphone, etc.) and available screen aera. Available screen area may relate to the total area of a device display screen capable of displaying a graphical user interface generated by the user device. The adaptive user interface amelioration program 150 may identify the type of device used by a user participant in the web conference using client and/or server-side device detection methods, such as inspecting the HTTP User-Agent header.

Additionally, the adaptive user interface amelioration program 150 may identify various user profile characteristics. For example, the adaptive user interface amelioration program 150 may identify web conference participants through log-in credentials, usernames, organization names, organization roles, device IDs, etc., and retrieve user preferences, such as brightness settings, contrast settings, screen zoom settings, image quality (e.g., 1080p, 720i, etc.) settings, and any other accessibility settings, for the participants that have opted-in to sharing information with the adaptive user interface amelioration program 150.

Then, at 208, the adaptive user interface amelioration program 150 extracts topical elements within the received shared content. The adaptive user interface amelioration program 150 may utilize text-to-speech technology and natural language understanding components to translate the conversation received in the audio feed in real time and extract keywords and topics discussed between the web conference participants. For example, if the screen sharing participant is currently discussing a chart depicted on a presentation slide along with text states "Please draw your attention to the graph", the adaptive user interface amelioration program 150 may extract the keyword "graph" and identify it as a topical element being discussed by the web conference participants.

Next, at 210, the adaptive user interface amelioration program 150 identifies screen locations of objects and text on a shared screen. The adaptive user interface amelioration program 150 may utilize the keywords, extracted in step 208, to identify screen locations of objects and text on the shared screen. The adaptive user interface amelioration program 150 may utilize optical character recognition technology, video image object detection, and image segmentation components to identify objects (e.g., images and image segments) and text and their corresponding locations on the user device display screen of a specific web conference participant in real time. For example, the adaptive user interface amelioration program 150 may identify the "graph" from the previous example is located in a specific section of the user device display screen using pixel locations or coordinates of each corner, a perimeter, or a geometric center of the identified object. In one or more other embodiments, the adaptive user interface amelioration program 150 may identify the location of an element as being the area of the element on the user device display screen.

Due to the adaptive user interface amelioration program 150 utilizing optical character recognition and other image recognition technologies to identify objects and text during a screen sharing session, the adaptive user interface amelioration program 150 may calculate a confidence score as to the accuracy of the prediction associated with an object, image, or text. Once an object, image, or text satisfies a preconfigured threshold level of confidence score, the adaptive user interface amelioration program 150 may label or tag the object, image, or text as being the element associated with the highest confidence score.

The adaptive user interface amelioration program 150 may identify, in real-time, relations between labels for objects and extracted text and their associated screen locations from screen sharing session with the keywords and topics of the current conversation. The adaptive user interface amelioration program 150 may identify the relations using natural language word embedding/association methods and/or semantics knowledge graphs of spoken concepts and labelled objects. In one or more embodiments, the adaptive user interface amelioration program 150 may store the identified relation(s) in an in-memory cache or database, such as storage 124.

Additionally, the adaptive user interface amelioration program 150 may also map the locations relative to any other objects identified on the user device display screen. For example, if the adaptive user interface amelioration program 150 identifies, through optical character recognition, that two graphs are present in a current screen share, the adaptive user interface amelioration program 150 may determine the relative locations of the two graphs to each other. The adaptive user interface amelioration program 150 may temporarily store the mapping between the objects and segments of images, their locations, labels, and confidence scores in a screen share memory repository.

Then, at 212, the adaptive user interface amelioration program 150 modifies a viewing area of shared content on the user device display screen. The adaptive user interface amelioration program 150 may modify the content based on the topical elements, the identified screen locations, the device characteristics, and the user profile characteristics. Prior to any modification, the adaptive user interface amelioration program 150 may detect the available screen area based on the identified device characteristics, including the available screen area. The adaptive user interface amelioration program 150 may extract the normal zoom or viewing size, contrast and brightness settings, and other accessibility preferences for the user from a user profile for a specific user. The adaptive user interface amelioration program 150 may modify the viewing area for a user to focus or highlight on the elements being discussed in the conversation between the web conference participants. For example, if the web conference participants are discussing a specific graph in a screen sharing session and one participant is viewing the screen share from a smartphone that makes viewing the graph difficult, the adaptive user interface amelioration program 150 may zoom into the graph and focus the image to allow the participant to more easily view the graph according to the user profile preferences. Conversely, if the adaptive user interface amelioration program 150 determines a participant is utilizing a device with adequate screen availability and quality (e.g., a large monitor displaying a high quality image), the adaptive user interface amelioration program 150 may determine that no modification or only partial modification (e.g., centering the graph being discussed on the display screen) is needed.

As another example, the adaptive user interface amelioration program 150 may modify the brightness, contrast, and/or audio volume settings to focus on or highlight either the object or text or the entire display screen in general. For example, if the user is viewing the web conference outdoors or in a brightly lit room, the adaptive user interface amelioration program 150 may determine the brightness settings of the user device should be increased to allow for better viewing of the shared content.

Additionally, in another embodiment, the adaptive user interface amelioration program 150 may modify the settings for the specific object or text being focused on and/or all elements except the object being focused on. For example, instead of zooming into the object or text, the adaptive user interface amelioration program 150 may increase the brightness of the object or text identified as being the subject of the current audio conversation and lower the brightness of the other objects and text displayed in the shared content, which overemphasizes the object or text at the subject of the web conference conversation. Similarly, the adaptive user interface amelioration program 150 may blur or lower the contrast of the elements not at the subject of the conversation while leaving the contrast of the object or text at the subject of the conversation the same.

The adaptive user interface amelioration program 150 may continuously monitor the conversation between the web conference participants and the screen share to determine if the viewing area should be modified further for one or more of the web conference participants based on changes to the topic and/or focus. The adaptive user interface amelioration program 150 may update the viewing area of the shared content should the topic and/or focus of the conversation change to a different section of the shared content.

In one or more embodiments, the adaptive user interface amelioration program 150 may consider the distance a participant observing the shared content is from the display screen of the user device. For example, the user may be seated two feet from a display screen while seated at a work desk but, if the user is utilizing a walking desk, the user may be four feet from the display screen and require the adaptive user interface amelioration program 150 to utilize more zoom when the user is observing shared content in a screen sharing session.

In one or more additional embodiments, the adaptive user interface amelioration program 150 may calculate a value associated with eye fatigue and/or eye strain. The adaptive user interface amelioration program 150 may utilize embedded or communicatively coupled photographic capture devices (e.g., cameras) to focus on a user's eyes while the user is observing the device display screen. The adaptive user interface amelioration program 150 may analyze the captured images from the photographic capture devices for characteristics associated with eye fatigue and/or eye strain, such as but not limited to, number of eye blinks, eye aspect ratio, pupil dilation, gaze detection, eye focus location, and eye openness. The adaptive user interface amelioration program 150 may be preconfigured with a weighted algorithm that predicts whether the user is experiencing eye fatigue and/or eye strain based on one or more of the characteristics. If the adaptive user interface amelioration program 150 determines the estimated value exceeds a preconfigured threshold for either the user's typical measurements or for a preconfigured average user, the adaptive user interface amelioration program 150 may determine the user is experiencing eye fatigue and/or eye strain and modify the viewing area accordingly to reduce or relieve the user eye fatigue and/or eye strain, such as changing the zoom, brightness, and/or contrast of the display screen.

Figure 3A:
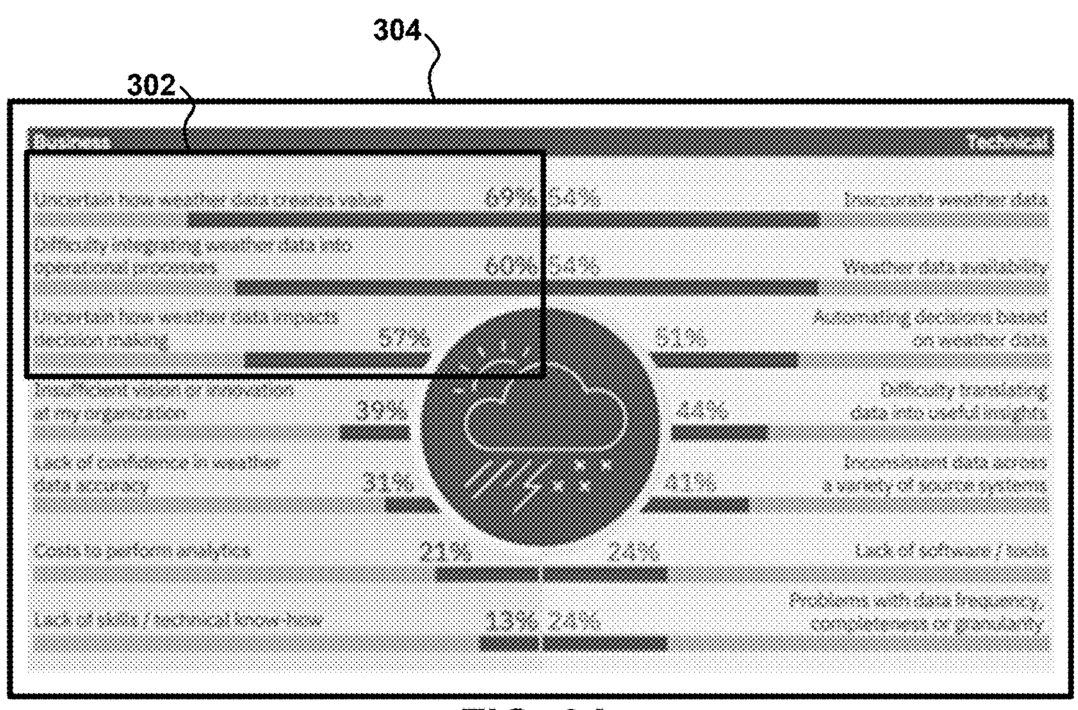
FIGS. 3A and 3B illustrate functional block diagrams of a screen share during a web conference according to at least one embodiment.
Figure 3B:
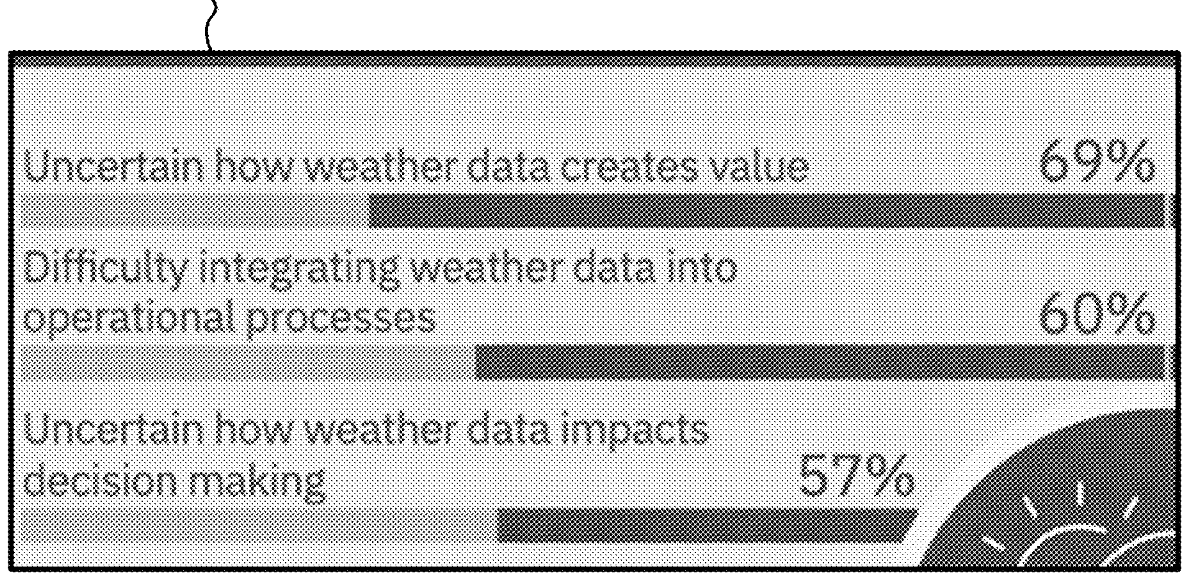

Referring now to FIGS. 3A and 3B, a functional block diagram of a screen sharing session is depicted according to at least one embodiment. In FIG. 3A, content shared by a host participant is depicted as it appears on the display screen of viewing participants to the screen share. The host participant may present data relating to surveys on various weather-related categories (i.e., "uncertain how weather data creates values", "difficulty integrating weather data into operation processes", and "uncertain how weather data impacts decision making") to the other web conference participants. Initially, the adaptive user interface amelioration program 150 may present all of the shared content 304 in the viewing area of the device display screen for a particular user. However, the data being presented during a specific time period may be represented in the upper-left quadrant 302 of the shared content 304 and the particular user may be viewing the shared content on a smartphone, which may make the shared content 304 difficult to view for the particular user based on user and/or device characteristics. Therefore, in FIG. 3B, the adaptive user interface amelioration program 150 may modify the viewing area of the shared content to focus in on information depicted in the upper-left quadrant 302 so that the data depicted in the upper-left quadrant 302 fills the viewing area of the user device display screen thereby making the shared content at the focus of the host participant's presentation easier to view for the particular user on the corresponding user device. For example, the adaptive user interface amelioration program 150 may zoom into the upper-left quadrant 302 so that the user can more easily see and understand the shared content on their specific device.

It may be appreciated that FIGS. 2, 3A, and 3B provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
- receiving shared content during a screen sharing session;
- identifying one or more device characteristics for a user device associated with a user and one or more user profile characteristics for the user;
- extracting topical elements within the received shared content;
- associating, using natural language word embedding or a semantics knowledge graph, the extracted topical elements with labels of one or more objects and/or one or more text elements and their corresponding screen locations;

identifying a location of the one or more objects and/or the one or more text elements in the shared content based on the associating; and modifying a viewing area of the shared content on a display screen of the user device, wherein the modifying comprises increasing a brightness level of the one or more objects and decreasing a brightness level of all other objects displayed in the shared content.

2. The method of claim 1, further comprising:

performing an initialization phase comprising integrating speech-to-text.

3. The method of claim 1, wherein the one or more device characteristics comprise a type of the user device and an available screen area.

4. The method of claim 1, wherein the location relates to pixel coordinates for one or more corners, perimeter locations, or a geographic center of an object or a series of text within the shared content as identified through one or more of optical character recognition, video image object detection, and image segmentation.

5. The method of claim 3, wherein the modifying is selected from a group consisting of zooming into the location based on the type and the available screen area, adjusting one or more contrast settings, and adjusting one or more volume settings.

6. The method of claim 1, further comprising:

capturing and storing user preferences either during or before the screen sharing session, wherein the user preferences are selected from a group consisting of preconfigured font size preference, preconfigured image size preference, speaker volume preferences, microphone volume preferences, topics and keywords of interest from historical communications, contrast settings, brightness settings, screen zoom settings, and image quality preference.

7. The method of claim 5, wherein the modifying is specific to the location of the one or more objects and/or the one or more text elements.

8. A computer system comprising:

a processor set;

one or more computer-readable storage media; and program instructions stored on the one or more computer-readable storage media set to cause the processor to perform operations comprising:

receiving shared content during a screen sharing session;

identifying one or more device characteristics for a user device associated with a user and one or more user profile characteristics for the user;

associating, using natural language word embedding or a semantics knowledge graph, extracted topical elements with labels of one or more objects and/or one or more text elements and their corresponding screen locations;

identifying a location of the one or more objects and/or the one or more text elements in the shared content based on the associating; and modifying a viewing area of the shared content on a display screen of the user device, wherein the modifying comprises increasing a brightness level of the one or more objects and decreasing a brightness level of all other objects displayed in the shared content.

9. The computer system of claim 8, further comprising:

performing an initialization phase comprising integrating speech-to-text.

10. The computer system of claim 8, wherein the one or more device characteristics comprise a type of the user device and an available screen area.

11. The computer system of claim 8, wherein the location relates to pixel coordinates for one or more corners, perimeter locations, or a geographic center of an object or a series of text within the shared content as identified through one or more of optical character recognition, video image object detection, and image segmentation.

12. The computer system of claim 10, wherein the modifying is selected from a group consisting of zooming into the location based on the type and the available screen area, adjusting one or more contrast settings, and adjusting one or more volume settings.

13. The computer system of claim 8, further comprising:

capturing and storing user preferences either during or before the screen sharing session, wherein the user preferences are selected from a group consisting of preconfigured font size preference, preconfigured image size preference, speaker volume preferences, microphone volume preferences, topics and keywords of interest from historical communications, contrast settings, brightness settings, screen zoom settings, and image quality preference.

14. The computer system of claim 13, wherein the modifying is specific to the location of the one or more objects and/or the one or more text elements.

15. A computer program product comprising:

one or more computer-readable storage media; and program instructions stored on the one or more computer-readable storage media to perform operations comprising:

receiving shared content during a screen sharing session;

identifying one or more device characteristics for a user device associated with a user and one or more user profile characteristics for the user;

associating, using natural language word embedding or a semantics knowledge graph, extracted topical elements with labels of one or more objects and/or one or more text elements and their corresponding screen locations;

identifying a location of the one or more objects and/or the one or more text elements in the shared content based on the associating; and modifying a viewing area of the shared content on a display screen of the user device, wherein the modifying comprises increasing a brightness level of the one or more objects and decreasing a brightness level of all other objects displayed in the shared content.

16. The computer program product of claim 15, further comprising:

performing an initialization phase comprising integrating speech-to-text.

17. The computer program product of claim 15, wherein the one or more device characteristics comprise a type of the user device and an available screen area.

18. The computer program product of claim 15, wherein the location relates to pixel coordinates for one or more corners, perimeter locations, or a geographic center of an object or a series of text within the shared content as identified through one or more of optical character recognition, video image object detection, and image segmentation.

19. The computer program product of claim 17, wherein the modifying is selected from a group consisting of zooming into the location based on the type and the available screen area, adjusting one or more contrast settings, and adjusting one or more volume settings.

20. The computer program product of claim 15, further comprising:

capturing and storing user preferences either during or before the screen sharing session, wherein the user preferences are selected from a group consisting of preconfigured font size preference, preconfigured image size preference, speaker volume preferences, microphone volume preferences, topics and keywords of interest from historical communications, contrast settings, brightness settings, screen zoom settings, and image quality preference.

* * * * *